US012647753B2

(12) United States Patent
Lewis et al.

(10) Patent No.: US 12,647,753 B2
(45) Date of Patent: Jun. 2, 2026

(54) SYSTEM AND METHOD FOR GENERATING FLOOR PLANS USING USER DEVICE SENSORS

(71) Applicant: Xactware Solutions, Inc., Lehi, UT (US)

(72) Inventors: Jeffery D. Lewis, Orem, UT (US); Jeffrey C. Taylor, Alpine, UT (US)

(73) Assignee: Xactware Solutions, Inc., Lehi, UT (US)

( * ) Notice: Subject to any disclaimer, the term of this patent is extended or adjusted under 35 U.S.C. 154(b) by 0 days.

(21) Appl. No.: 16/580,741

(22) Filed: Sep. 24, 2019

(65) Prior Publication Data

US 2020/0100066 A1     Mar. 26, 2020

Related U.S. Application Data

(60) Provisional application No. 62/735,260, filed on Sep. 24, 2018.

(51) Int. Cl.
   *H04W 4/029*      (2018.01)
   *H04M 1/724*      (2021.01)
   *H04W 4/33*       (2018.01)

(52) U.S. Cl.
   CPC ........... *H04W 4/029* (2018.02); *H04M 1/724* (2021.01); *H04W 4/33* (2018.02)

(58) Field of Classification Search
   CPC ... H04B 17/318; H04W 4/33; H04M 1/72519
   See application file for complete search history.

(56) References Cited

U.S. PATENT DOCUMENTS

| | | | |
|---|---|---|---|
| 5,701,403 A | 12/1997 | Watanabe et al. | |
| 6,446,030 B1 | 9/2002 | Hoffman et al. | |
| 6,448,964 B1 | 9/2002 | Isaacs et al. | |
| 8,533,063 B2 | 9/2013 | Erickson | |
| 8,843,304 B1 | 9/2014 | Dupont et al. | |
| 8,868,375 B1 * | 10/2014 | Christian | ............. G01C 21/206 |
| | | | 702/155 |
| 8,983,806 B2 | 3/2015 | Labrie et al. | |
| 9,158,869 B2 | 10/2015 | Labrie et al. | |
| 9,501,700 B2 | 11/2016 | Loveland et al. | |
| 9,679,227 B2 | 6/2017 | Taylor et al. | |

(Continued)

FOREIGN PATENT DOCUMENTS

| | | |
|---|---|---|
| WO | 2014/151122 A1 | 9/2014 |
| WO | 2016/154306 A1 | 9/2016 |
| WO | 2017/100658 A1 | 6/2017 |

OTHER PUBLICATIONS

International Search Report of the International Searching Authority mailed on Mar. 27, 2017, issued in connection with International Application No. PCT/US2016/65947 (3 pages).

(Continued)

*Primary Examiner* — Dai Phuong

(74) *Attorney, Agent, or Firm* — McCarter & English, LLP

(57)            ABSTRACT

A system and method for generating floor plans using a mobile device, comprising a memory and a processor in communication with the memory. The processor captures a plurality of walls in a room using one or more sensors of the mobile device. The processor then captures one or more openings in the room. The processor then generates a floor plan based on the walls and the openings.

20 Claims, 10 Drawing Sheets

(56) References Cited

U.S. PATENT DOCUMENTS

| | | | |
|---|---|---|---|
| 10,127,670 B2 | 11/2018 | Lewis et al. | |
| 10,181,079 B2 | 1/2019 | Labrie et al. | |
| 10,387,582 B2 | 8/2019 | Lewis et al. | |
| 10,445,438 B1* | 10/2019 | Motonaga | G06F 30/13 |
| 10,529,028 B1 | 1/2020 | Davis et al. | |
| 11,314,905 B2 | 4/2022 | Childs et al. | |
| 2002/0116254 A1 | 8/2002 | Stein et al. | |
| 2003/0009315 A1 | 1/2003 | Thomas et al. | |
| 2007/0080961 A1 | 4/2007 | Inzinga et al. | |
| 2007/0276626 A1 | 11/2007 | Bruffey | |
| 2009/0179895 A1 | 7/2009 | Zhu et al. | |
| 2010/0110074 A1 | 5/2010 | Pershing | |
| 2010/0114537 A1 | 5/2010 | Pershing | |
| 2010/0296693 A1 | 11/2010 | Thornberry et al. | |
| 2011/0056286 A1 | 3/2011 | Jansen | |
| 2011/0157213 A1 | 6/2011 | Takeyama et al. | |
| 2011/0191738 A1 | 8/2011 | Walker et al. | |
| 2012/0026322 A1 | 2/2012 | Malka et al. | |
| 2012/0179431 A1 | 7/2012 | Labrie et al. | |
| 2012/0253725 A1 | 10/2012 | Malka et al. | |
| 2012/0253751 A1 | 10/2012 | Malka et al. | |
| 2013/0201167 A1 | 8/2013 | Oh et al. | |
| 2013/0226451 A1 | 8/2013 | O'Neill et al. | |
| 2013/0262029 A1 | 10/2013 | Pershing | |
| 2013/0267260 A1 | 10/2013 | Chao et al. | |
| 2013/0314688 A1 | 11/2013 | Likholyot | |
| 2014/0032179 A1* | 1/2014 | Solihin | G06F 30/18 |
| | | | 703/1 |
| 2014/0043436 A1 | 2/2014 | Bell et al. | |
| 2014/0301633 A1 | 10/2014 | Furukawa et al. | |
| 2014/0320661 A1* | 10/2014 | Sankar | H04N 23/62 |
| | | | 348/158 |
| 2015/0029182 A1 | 1/2015 | Sun et al. | |
| 2015/0073864 A1 | 3/2015 | Labrie et al. | |
| 2015/0093047 A1 | 4/2015 | Battcher et al. | |
| 2015/0116509 A1 | 4/2015 | Birkler et al. | |
| 2015/0153172 A1* | 6/2015 | Starns | G01C 11/02 |
| | | | 382/284 |
| 2015/0193971 A1 | 7/2015 | Dryanovski et al. | |
| 2015/0213558 A1 | 7/2015 | Nelson | |
| 2015/0227645 A1 | 8/2015 | Childs et al. | |
| 2015/0269438 A1 | 9/2015 | Samarasekera et al. | |
| 2015/0302529 A1 | 10/2015 | Jagannathan | |
| 2016/0098802 A1 | 4/2016 | Bruffey et al. | |
| 2016/0110480 A1 | 4/2016 | Randolph | |
| 2016/0246767 A1 | 8/2016 | Makadia et al. | |
| 2016/0282107 A1 | 9/2016 | Roland et al. | |
| 2017/0124713 A1 | 5/2017 | Jurgenson et al. | |
| 2017/0132711 A1 | 5/2017 | Bruffey et al. | |
| 2017/0132835 A1 | 5/2017 | Halliday et al. | |
| 2017/0169459 A1 | 6/2017 | Bruffey et al. | |
| 2017/0193297 A1 | 7/2017 | Michini et al. | |
| 2017/0206648 A1 | 7/2017 | Marra et al. | |
| 2017/0221152 A1 | 8/2017 | Nelson et al. | |
| 2017/0316115 A1 | 11/2017 | Lewis et al. | |
| 2017/0330207 A1 | 11/2017 | Labrie et al. | |
| 2017/0345069 A1 | 11/2017 | Labrie et al. | |
| 2018/0053329 A1 | 2/2018 | Roberts et al. | |
| 2018/0067593 A1* | 3/2018 | Tiwari | G08B 13/22 |
| 2018/0075168 A1 | 3/2018 | Tiwari et al. | |
| 2018/0089833 A1 | 3/2018 | Lewis et al. | |
| 2018/0286098 A1* | 10/2018 | Lorenzo | G06T 3/14 |
| 2018/0330528 A1 | 11/2018 | Loveland et al. | |
| 2018/0357819 A1 | 12/2018 | Oprea | |
| 2018/0373931 A1 | 12/2018 | Li | |
| 2019/0114717 A1 | 4/2019 | Labrie et al. | |
| 2019/0147247 A1 | 5/2019 | Harris et al. | |
| 2019/0228370 A1* | 7/2019 | Lien | G06Q 10/063112 |
| 2019/0340692 A1 | 11/2019 | Labrie et al. | |
| 2019/0377837 A1 | 12/2019 | Lewis et al. | |
| 2020/0143481 A1 | 5/2020 | Brown et al. | |
| 2021/0076162 A1* | 3/2021 | Wang | H04W 4/027 |
| 2021/0103687 A1 | 4/2021 | Harris et al. | |
| 2021/0350038 A1 | 11/2021 | Jenson et al. | |

OTHER PUBLICATIONS

Written Opinion of the International Searching Authority mailed on Mar. 27, 2017, issued in connection with International Application No. PCT/US2016/65947 (7 pages).

Office Action mailed Sep. 26, 2018, issued in connection with U.S. Appl. No. 15/374,695 (33 pages).

Notice of Allowance mailed May 13, 2019, issued in connection with U.S. Appl. No. 15/374,695 (7 pages).

Extended European Search Report mailed Jun. 11, 2019, issued in connection with European Patent Application No. 16873975.3 (8 pages).

Communication Pursuant to Article 94(3) EPC issued by the European Patent Office mailed on Apr. 22, 2020, issued In connection with European Patent Application No. 16873975.3 (6 pages).

International Search Report of the International Searching Authority mailed on May 14, 2015, issued in connection with International Application No. PCT/US15/015491(3 pages).

Written Opinion of the International Searching Authority mailed on May 14, 2015, issued in connection with International Application No. PCT/US15/015491 (9 pages).

Fung, et al., "A Mobile Assisted Localization Scheme for Augmented Reality," Department of Computer Science and Engineering, The Chinese University of Hong Kong, 2012 (76 pages).

Sankar, et al., "Capturing Indoor Scenes With Smartphones," UIST 12, Oct. 7-10, 2012, Cambridge, Massachusetts (9 pages).

Office Action mailed Aug. 8, 2017, issued in connection with U.S. Appl. No. 14/620,004 (26 pages).

Office Action mailed Aug. 28, 2018, issued in connection with U.S. Appl. No. 14/620,004 (33 pages).

Farin, et al., "Floor-Plan Reconstruction from Panoramic Images," Sep. 23-28, 2007, MM '07, ACM (4 pages).

Office Action mailed Mar. 29, 2019, issued in connection with U.S. Appl. No. 14/620,004 (22 pages).

Office Action mailed Dec. 10, 2019, issued in connection with U.S. Appl. No. 14/620,004 (27 pages).

Zhang, et al., "Wallk&Sketch: Create Floor Plans with an RGB-D Camera," Sep. 5-8, 2012, UbiComp '12, ACM (10 pages).

Office Action mailed Jul. 8, 2020, issued in connection with U.S. Appl. No. 14/620,004 (27 pages).

Office Action mailed Feb. 2, 2021, issued in connection with U.S. Appl. No. 14/620,004 (28 pages).

Communication Pursuant to Article 94(3) EPC issued by the European Patent Office mailed on Feb. 18, 2021, Issued in connection with European Patent Application No. 16873975.3 (5 pages).

Notice of Allowance mailed Aug. 19, 2021, issued in connection with U.S. Appl. No. 14/620,004 (11 pages).

Examiner-Initiated Interview Summary dated Aug. 10, 2021, issued in connection with U.S. Appl. No. 14/620,004 (1 page).

International Search Report of the International Searching Authority mailed on Feb. 11, 2019, issued in connection with International Application No. PCT/US18/60762 (3 pages).

Written Opinion of the International Searching Authority mailed on Feb. 11, 2019, issued in connection with International Application No. PCT/US18/60762 (7 pages).

Office Action mailed Apr. 16, 2020, issued in connection with U.S. Appl. No. 16/189,512 (10 pages).

U.S. Appl. No. 62/512,989, filed May 31, 2017 entitled, "Systems and Methods for Rapidly Developing Annotated Computer Models of Structures" (47 pages).

Office Action mailed Dec. 14, 2020, issued in connection with U.S. Appl. No. 16/189,512 (10 pages).

Extended European Search Report dated Jul. 1, 2021, issued by the European Patent Office in connection with European Application No. 18876121.7 (8 pages).

Office Action mailed Jul. 20, 2021, issued in connection with U.S. Appl. No. 16/189,512 (11 pages).

International Search Report of the International Searching Authority mailed on Apr. 8, 2022, issued in connection with International Application No. PCT/US21/63469 (5 pages).

(56) References Cited

OTHER PUBLICATIONS

Written Opinion of the International Searching Authority mailed on Apr. 8, 2022, issued in connection with International Application No. PCT/US21/63469 (6 pages).

Office Action mailed Mar. 25, 2022, issued in connection with U.S. Appl. No. 16/545,607 (56 pages).

Notice of Allowance mailed Apr. 8, 2022, issued in connection with U.S. Appl. No. 16/189,512 (8 pages).

Notice of Allowance mailed Dec. 16, 2021, issued in connection with U.S. Appl. No. 14/620,004 (12 pages).

Invitation to Pay Additional Fees issued by the International Searching Authority mailed on Feb. 2, 2022, issued in connection with International Application No. PCT/US21/63469 (2 pages).

Extended European Search Report dated Feb. 18, 2022, issued in connection with European Patent Application No. 19866788.3 (9 pages).

Notice of Allowance mailed Jun. 21, 2022, issued in connection with U.S. Appl. No. 16/189,512 (7 pages).

Dino, et al., "Image-Based Construction of Building Energy Models Using Computer Vision," Automation in Construction (2020) (15 pages).

Fathi, et al., "Automated As-Built 3D Reconstruction of Civil Infrastructure Using Computer Vision: Achievements, Opportunities, and Challenges," Advanced Engineering Informatics (2015) (13 pages).

International Search Report of the International Searching Authority mailed on Jul. 25, 2022, issued in connection with International Application No. PCT/US22/22024 (3 pages).

Written Opinion of the International Searching Authority mailed on Jul. 25, 2022, issued in connection with International Application No. PCT/US22/22024 (5 pages).

Communication Pursuant to Article 94(3) EPC issued by the European Patent Office mailed on Apr. 28, 2023, issued in connection with European Patent Application No. 19866788.3 (5 pages).

Communication Pursuant to Article 94(3) EPC mailed Jan. 23, 2024, issued by the European Patent Office in connection with European Patent Application No. 19866788.3 (5 pages).

Examination Report No. 1 mailed Jan. 24, 2024, issued by the Australian Patent Office in connection with Australian Patent Application No. 2019350710 (3 pages).

Office Action dated Oct. 22, 2025, issued by the Canadian Intellectual Property Office in connection with Canadian Patent Application No. 3,112,435 (7 pages).

International Search Report of the International Searching Authority mailed on Dec. 12, 2019, issued in connection with International Application No. PCT/US2019/52670 (3 pages).

Written Opinion of the International Searching Authority mailed on Dec. 12, 2019, issued in connection with International Application No. PCT/US2019/52670 (5 pages).

Examination Report No. 1 mailed Mar. 30, 2021, issued by the Australian Patent Office in connection with Australian Patent Application No. 2016366537 (6 pages).

* cited by examiner

SYSTEM AND METHOD FOR GENERATING FLOOR PLANS USING USER DEVICE SENSORS

RELATED APPLICATIONS

This application claims priority to U.S. Provisional Patent Application Ser. No. 62/735,260 filed on Sep. 24, 2018, the entire disclosure of which is hereby expressly incorporated by reference.

TECHNICAL FIELD

The present disclosure relates generally to a system and method for generating computerized models of structures using computing devices. More specifically, the present disclosure relates to a system and method for generating floor plans using user device sensors.

RELATED ART

In the insurance underwriting, building construction, solar, and real estate industries, computer-based systems for generating floor plans and layouts of physical structures such as residential homes, commercial buildings, etc., is becoming increasingly important. In particular, in order to generate an accurate floor plan of a physical structure, one must have an accurate set of data which adequately describes that structure. Moreover, it is becoming increasingly important to provide computer-based systems which have adequate capabilities to generate floor plans and layouts of both the interior and exterior features of buildings, as well as to identify specific features of such buildings (e.g., doors, windows, closets, etc.).

With the advent of mobile data capturing devices including phones, tablets and ground based vehicles, it is now possible to gather and process accurate data from sites located anywhere in the world. The data can be processed either directly on a hand-held computing device or some other type of device, such as a remote vehicle (provided that such devices have adequate computing power), or remotely on a data processing server.

Accordingly, what would be desirable is a system and method for generating floor plans using user device sensors.

SUMMARY

The present invention relates to a system and method for generating floor plans using user device sensors. The system includes a floor plan modeling engine executed by a computing device, such as a mobile smart phone. The system obtains raw data scanned by one or more sensors in communication with the smart phone, such as mobile sensor data (gyroscope/accelerometer/barometer, etc.), laser range data (point cloud data), LIDAR, global positioning system (GPS) data, X-ray data, depth maps, and other types of data. The raw data relates to points on a wall of a structure, and points on an opening (such as a door or a window) of the structure. From the points, the system determines a dimensioned floor plan for one or more rooms inside the structure.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to a system and method for generating floor plans using user device sensors, as described in detail below in connection with FIGS. 1-12.

With the advent of modern mobile devices, it is now possible to track the movement of a mobile device through three dimensional ("3D") space in real time. Recent advances in sensor technology and sensor fusion processing techniques have opened up new opportunities for device positioning and movement tracking applications. For example, the ARKit from Apple® uses the device's internal and external sensors combined with sophisticated sensor fusion algorithms to enable the device to deliver the position, orientation and tracking of the device in 3D space in real time. The application described here utilizes this stream of data to generate an accurate floor plan of a structure complete with measurements. Although this example uses an Apple® device running the ARKit in the background, the system of the present disclosure could be used by any mobile device which can deliver position and orientation information and movement tracking information in real time.

The system described herein produces a dimensioned floor plan, room by room, using a user device, such as a mobile device. The system uses the user device's internal and external sensors to track its position in space and defines points in a coordinate space which define a wall. The wall points are collected one wall at a time until all the walls of a room have been defined. The intersecting points of the walls are used to define the shape and measurements of that room. Multiple rooms can be captured by using the user device's positional tracking. The new room's walls are tracked relative to all the previously captured rooms of the floor, thus creating the dimensioned floor plan.

Figure 1:
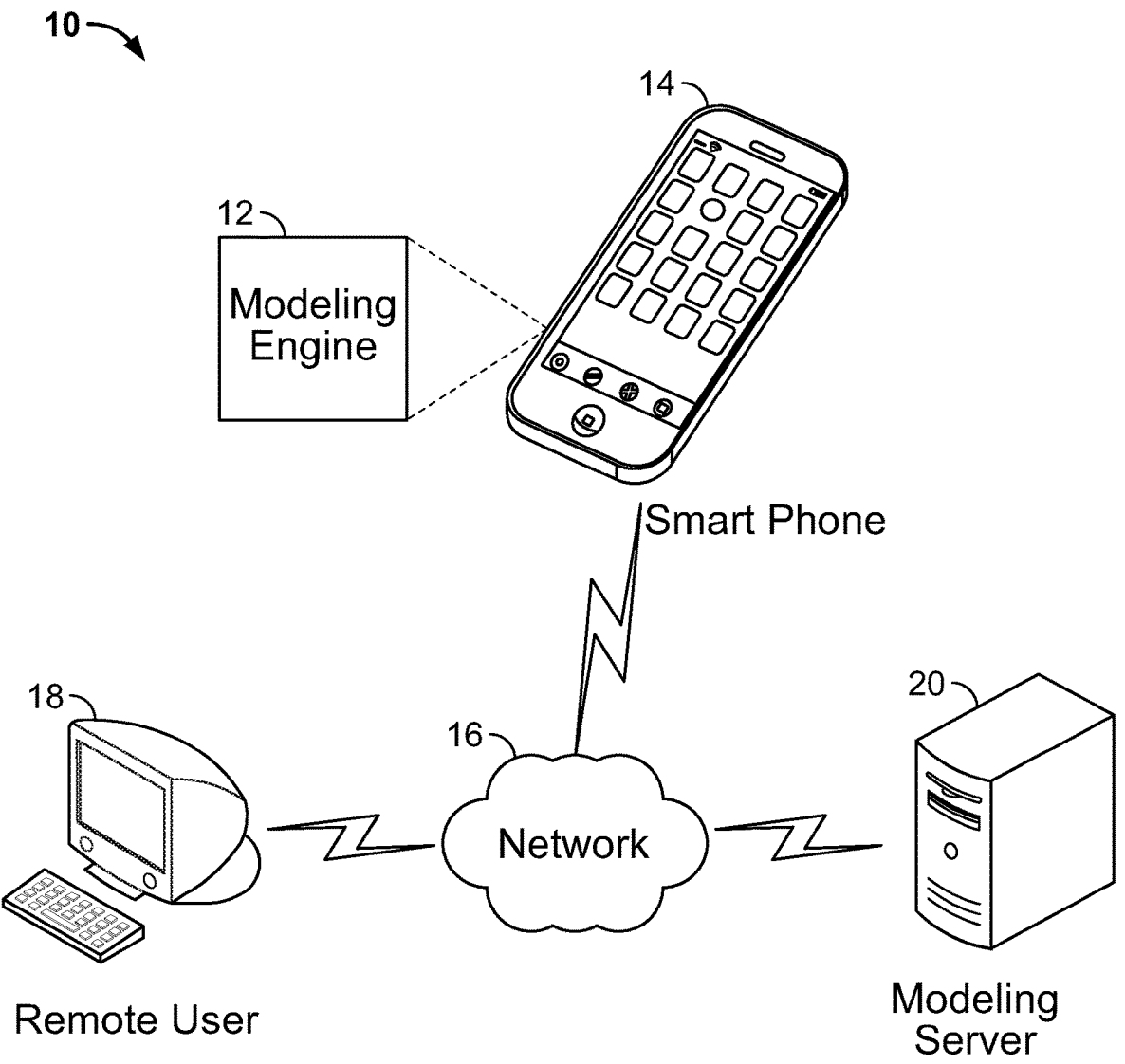
FIG. 1 is a diagram illustrating sample hardware components on which the system of the present disclosure could be implemented.

FIG. 1 is a diagram, indicated generally at 10, illustrating hardware and software components of the system of the present disclosure. The system includes a floor plan modeling engine 12 which is embodied as specially-programmed software code that executes on a suitable user device, such as a smart phone 14. As will be discussed in greater detail below, the modeling engine 12 allows a user of the smart phone 14 to quickly and conveniently generate dimensioned floor plans of one or more rooms in a structure. It is noted that the smart phone 14 could be substituted for another type of computing device, such as a tablet computer, a laptop computer, a personal (standalone) computer, a smartwatch, etc., without departing from the spirit or scope of the present disclosure. In the case of a smart phone, the smart phone 14 could execute any suitable operating system. The modeling engine 12 is stored in non-volatile memory of the smart phone 14, and is executed by a processor of the smart phone 14. As will be discussed in greater detail below, the modeling engine processes raw data obtained by one or more sensors associated with the phone 14, such as the phone's camera and/or other sensors such as a light detection and ranging (LIDAR) camera, an infrared (IR) camera, mobile sensor data (gyroscope, accelerometer, barometer, etc.), laser range data (point cloud data), global positioning system (GPS) data, X-ray data, depth maps, and other types of data.

The smart phone 14 can communicate via a network 16 with a remote user's computer system 18, and/or with a remote structure modeling server 20. The remote structure modeling server 20 could also be programmed with and execute the modeling engine 12. Such an arrangement is particularly advantageous where the smart phone 14 does not have sufficient processing power to rapidly generate a floor plan(s), in which case the server 20 can remotely perform such functions. In such circumstances, the remote server 20 would receive raw captured data from the smart phone 14 via the network 16. The network 16 can include the Internet, a cellular data network, a wireless network, a wired network, etc. The server 20 could be a stand-alone server, or it could be part of a "cloud" computing environment/platform.

It should be understood that FIG. 1 is only one potential configuration, and the system of the present disclosure can be implemented using a number of different configurations. The process steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure may be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Although FIG. 1 relates to a smart phone, it should be understood that the use of a smart phone is only by way of example and that the systems, methods and embodiments discussed throughout this disclosure can use any user device.

Figure 2:
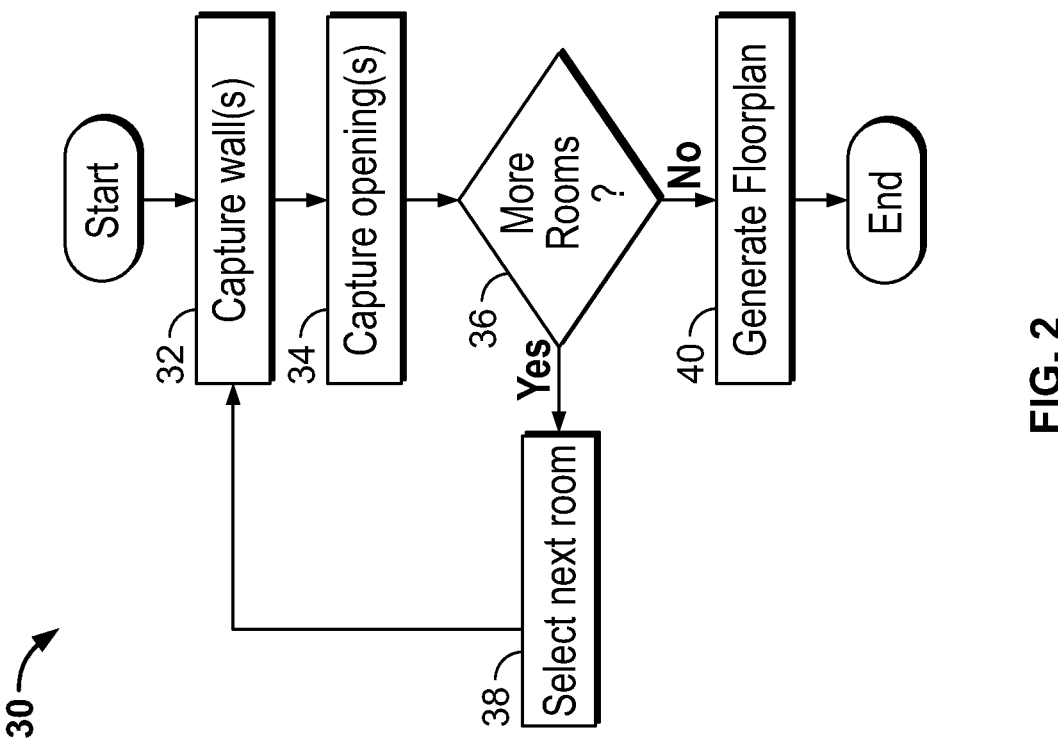
FIG. 2 is a flowchart illustrating overall process steps carried out by the system of the present disclosure.

FIG. 2 shows a flowchart illustrating the overall process steps being carried out by the system, indicated generally at method 30. In step 32, the system captures one or more walls in a room. In step 34, the system captures one or more openings in the room. The openings can include, for example, a doorway, a window, a closet, etc. In step 36, the system determines whether further rooms need to be captured. It should be understood that the rooms are captured one at a time. As such, following the completion of steps 32 and 34, the user can be prompted with an option of capturing more rooms or completing the capturing process and proceeding to step 40, where the system generates a floor plan. If there are more rooms that the user desires to capture, the system proceeds to step 38, where the system selects the next room. For example, the system concludes associating captured walls and captured openings with a first room and proceeds to steps 32 and 34, where the systems captures one or more walls and one or more openings in a second room and associated the newly captured rooms and openings with the second room. Those skilled in the art would understand that the system can cycle between step 32 through step 38 for as many rooms as desired. Each step of FIG. 2 will be described in greater detail below.

Figure 3:
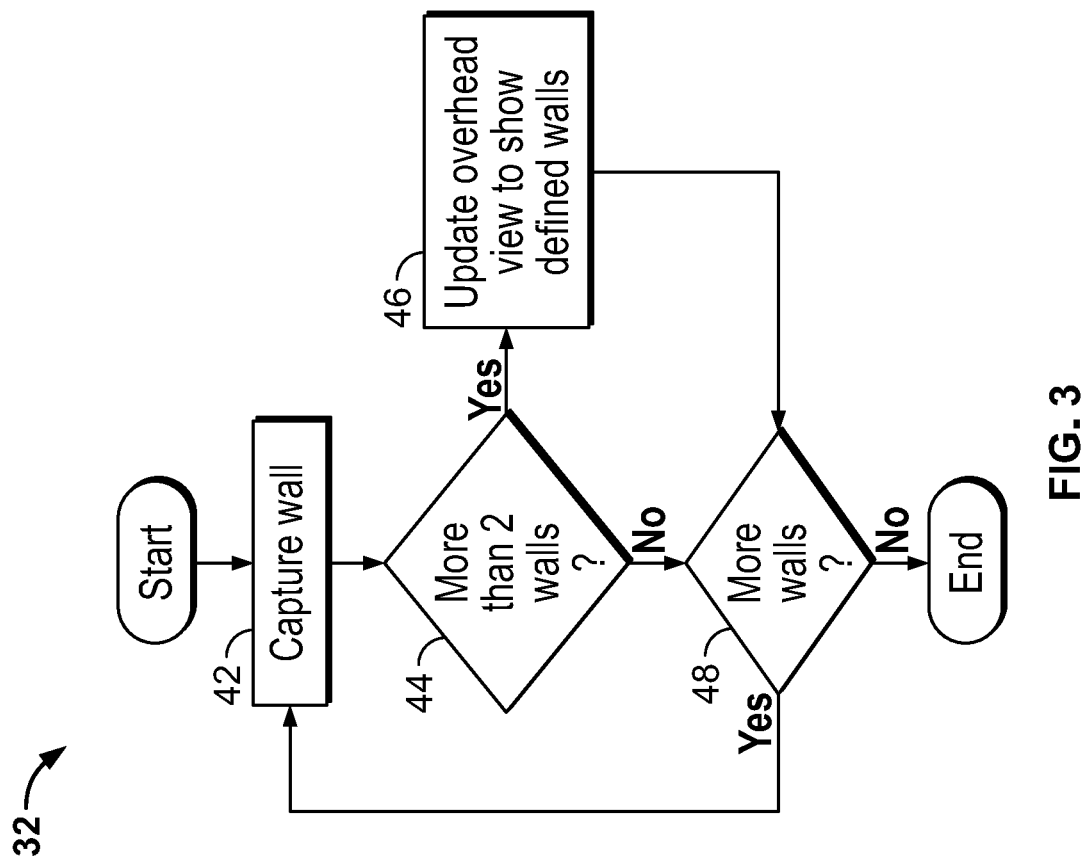
FIG. 3 is a flowchart illustrating step 32 of FIG. 2 in greater detail.
Figure 4:
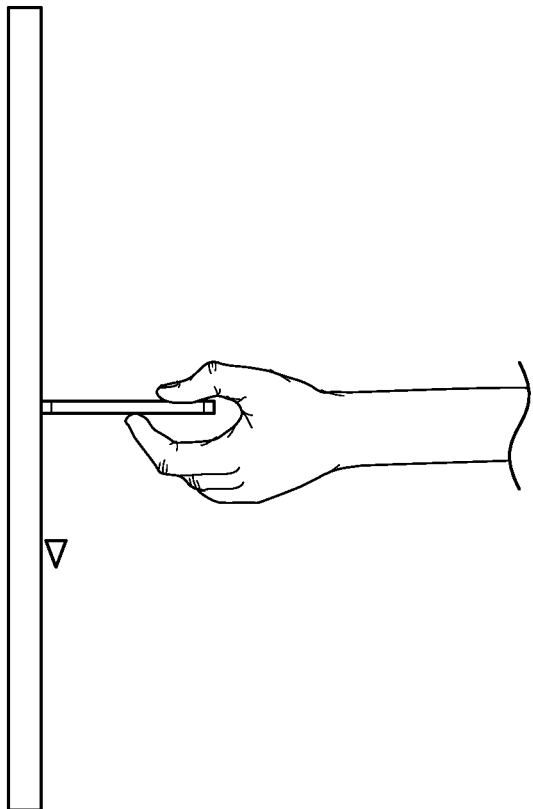
FIG. 4 is a diagram illustrating a user placing the edge of the user device against the wall with the camera pointing towards the floor and the user pressing a capture button.

FIG. 3 shows a flowchart illustrating step 32 of FIG. 2 in greater detail. In step 42, the system captures a wall. Specifically, the system captures two points on the wall (a first wall point and a second wall point) and defines an infinite line. A wall point is defined by placing the edge of the device (e.g., the edge which contains the camera) against a wall with the camera pointing towards the floor and the user pressing a capture button, as illustrated in FIG. 4. In an example, a wall line can be defined by two wall points at least 6 inches apart. However, those skilled in the art would understand that the system can use any distance between two wall points. The system can prompt the user to capture the wall point. The system can further track the movement of the device as the user moves from one wall point to another wall point. This allows the system to locate each wall point relative to other previously captured wall points.

Figure 5:
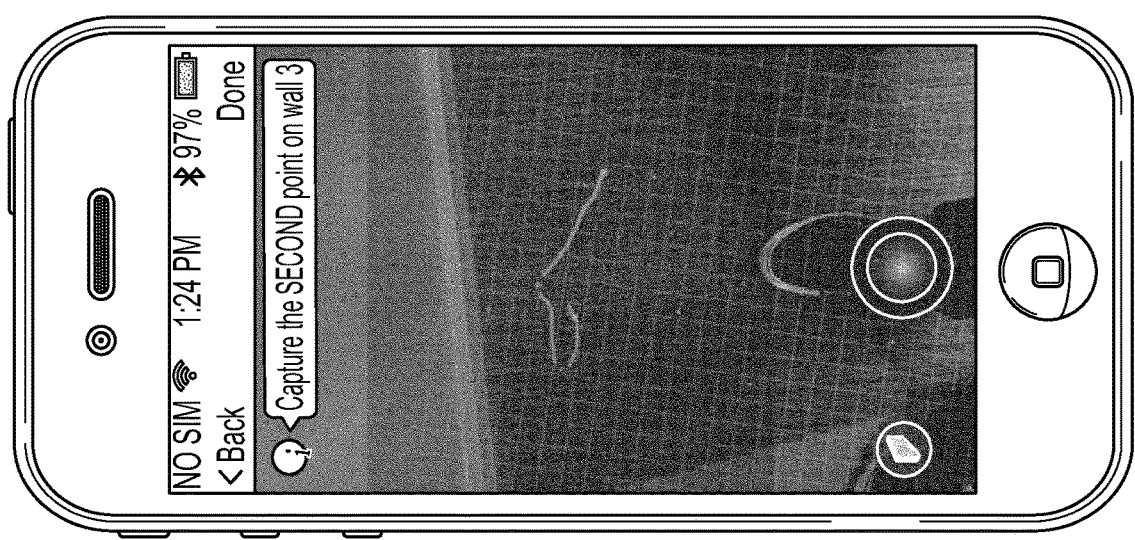
FIG. 5 is a diagram illustrating an example of the overhead view.
Figure 5:
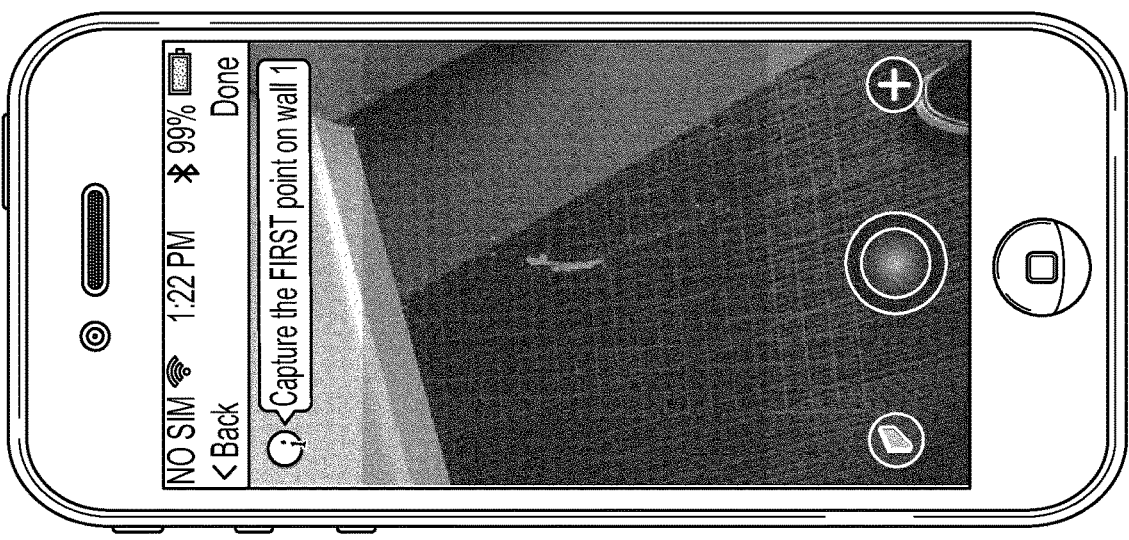

It should be noted that throughout the wall capturing process, an overhead view of the walls being defined can be shown to the user on the device. This provides feedback as to the progress of the room capture. The overhead view can update and show the user movement and wall points when the device moves from one location in space to another location in space. This allows the user to monitor proper positional tracking. The overhead view also updates when new walls are captured. FIG. 5 is an illustration showing an example of the overhead view.

Figure 6:
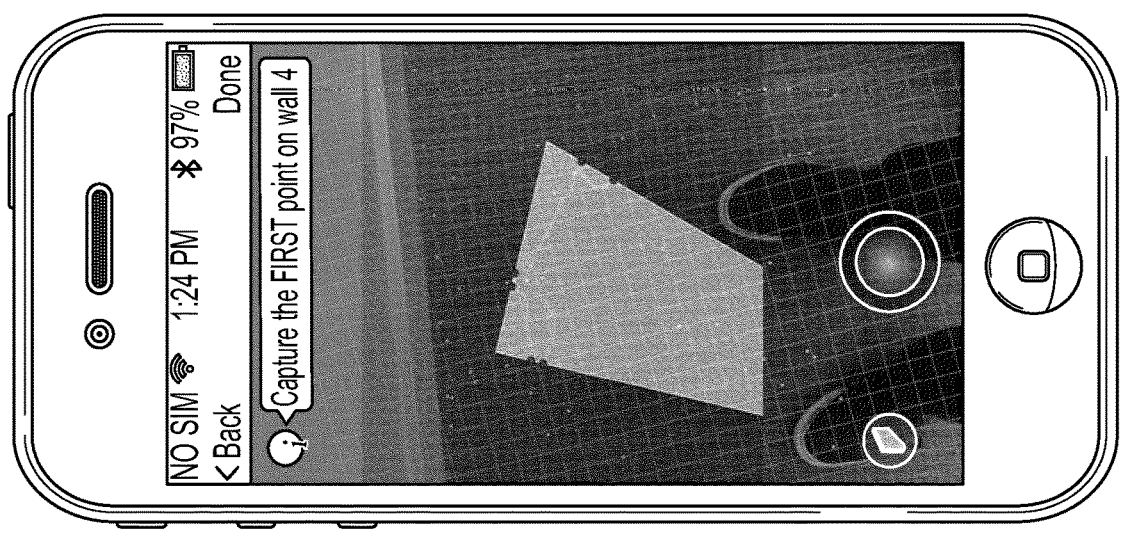
FIG. 6 is a diagram illustrating the overhead view with defined walls.

In step 44, the system determines whether there are more than two walls captured. It should be understood that as more walls of a room are captured, the lines formed by each pair of wall points will intersect, thus forming a corner where two walls meet. As more and more walls are captured, a shape of the room is determined by the system. When the system determines that more than two walls have been captured, the system will proceed to step 46 and update the overhead view to show the defined walls. FIG. 6 is an illustration showing the overhead view with defined walls. In step 48, the system determines whether more walls should be capture. In a first example, the system can determine whether there are more walls to capture by promoting the user and soliciting a reply. In a second example, the system can have a predetermined number of walls threshold and determine whether a number of captured walls meets the predetermined threshold. When the system determines that more walls should be captured, the system proceeds to step 42 to continue the wall capturing process.

Figure 7:
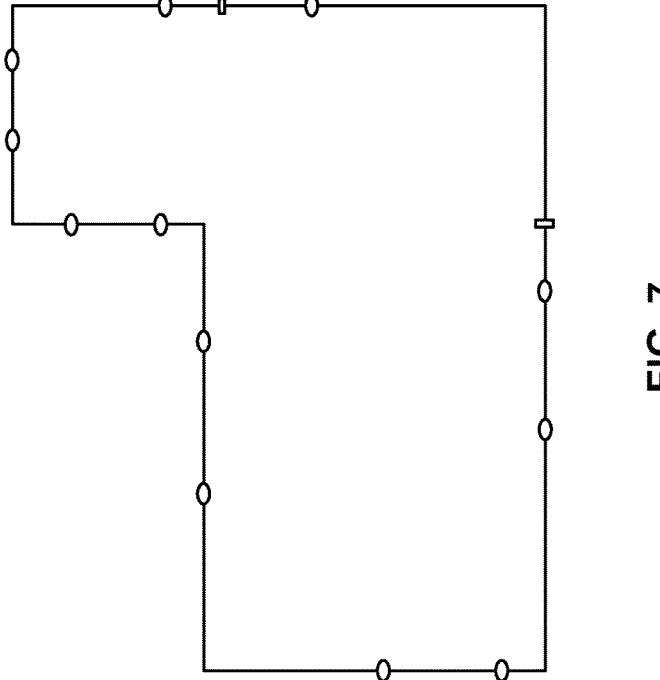
FIG. 7 is a diagram illustrating the system determining the corners of a room.

Once all the walls of the room have been defined, the system takes a line segment that defines each wall and projects 3D coordinates of the line segment into a 2D coordinate space. The system then calculates the intersecting points of the walls to determine the corners of a room. The calculated corner points are used to define and measure a length and a position of the real-world wall. FIG. 7 is an illustration showing the system determining the corners of a room.

Figure 8:
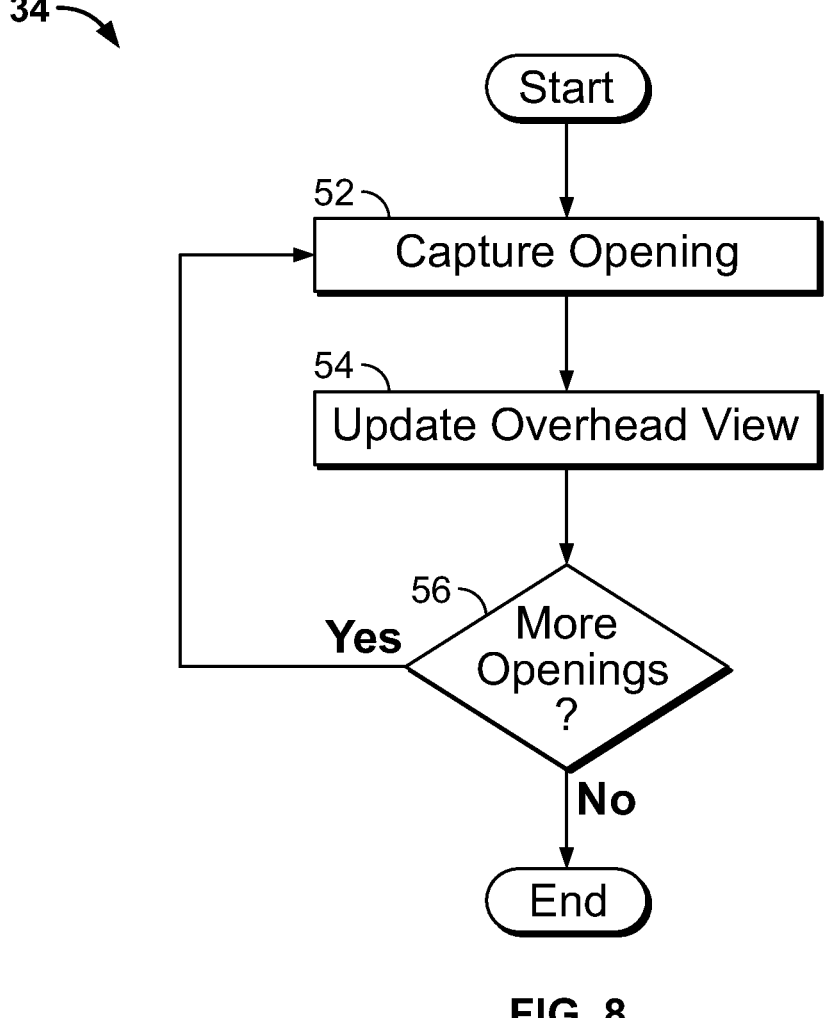
FIG. 8 is a flowchart illustrating step 34 of FIG. 2 in greater detail.

When all of the walls have been captured, the user switches from wall capture mode to opening capture mode, as indicated by step 34 of FIG. 2. FIG. 8 shows a flowchart illustrating step 34 of FIG. 2 in greater detail. In step 52, the system captures an opening. Specifically, the system prompts the user to capture a first point of an opening and a second point of the opening. As mentioned above, the openings can include, for example, a doorway, a window, a closet, etc. The user can capture the first point and the second point of the opening by placing the user device on or next to an end of the opening, and pressing a capture button on the user device. Those skilled in the art would understand that the capture button can be any designated button on the user device or on a touchscreen of the user device, a voice command, etc.

In step 54, the system updates the overhead view to display the captured opening. It should be understood that the system can update the overhead view after each captured opening, after all of the openings have been captured, after a user command, etc.

Figure 9:
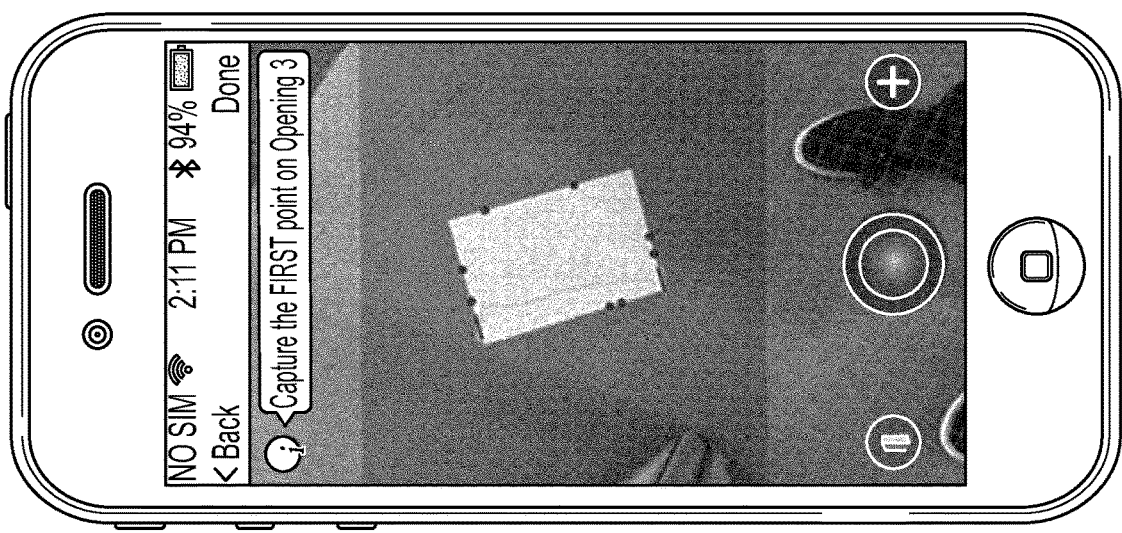
FIG. 9 is a diagram illustrating the system prompting the user to capture multiple openings.
Figure 9:
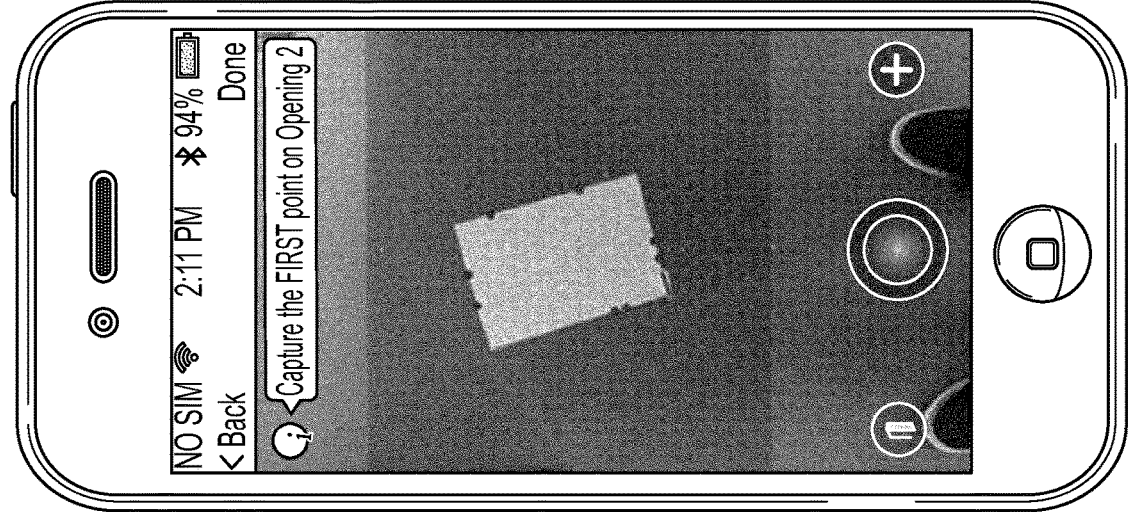
Figure 9:
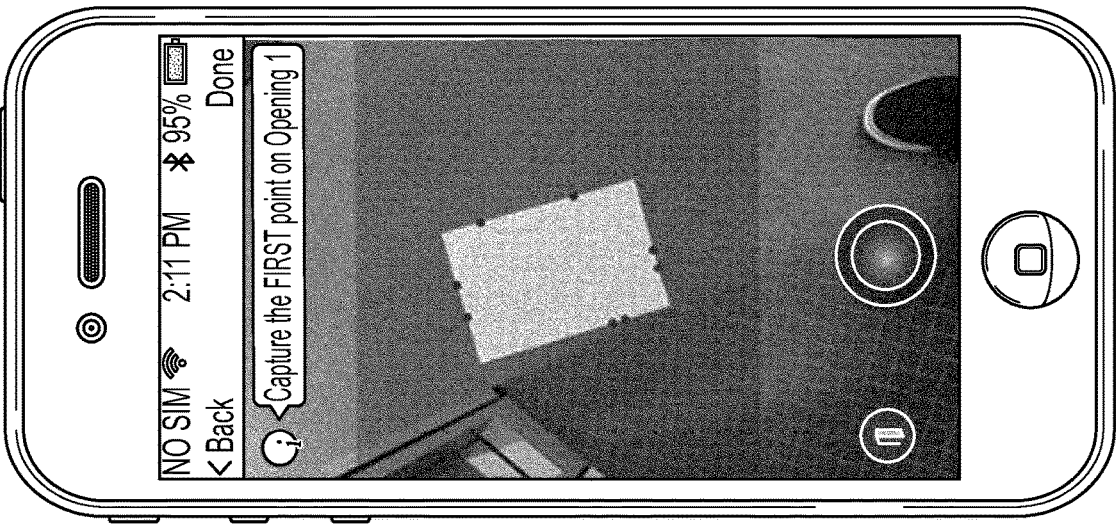

In step 56, the system, determines whether there are more openings to be captured. In a first example, the system prompts the user with an inquiry asking whether more openings should be captured. In a second example, the system checks whether a predetermined condition, such as a preset number of openings, has been met. When the system determines that more openings should to be captured, the system returns to step 52. When the system determines that all of the openings have been captured, the system ends the method of FIG. 8. FIG. 9 is an illustration showing the system prompting the user to capture multiple openings.

Figure 10:
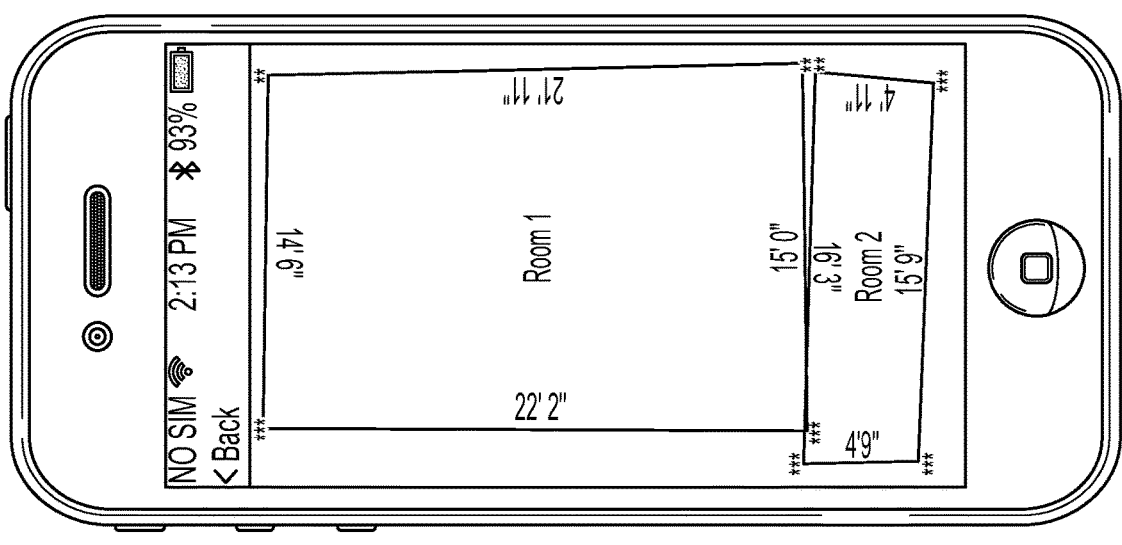
FIG. 10 is a diagram illustrating the user capturing the walls and openings for a first room and a second room, and the generated floor plan of the first room and the second room.
Figure 10:
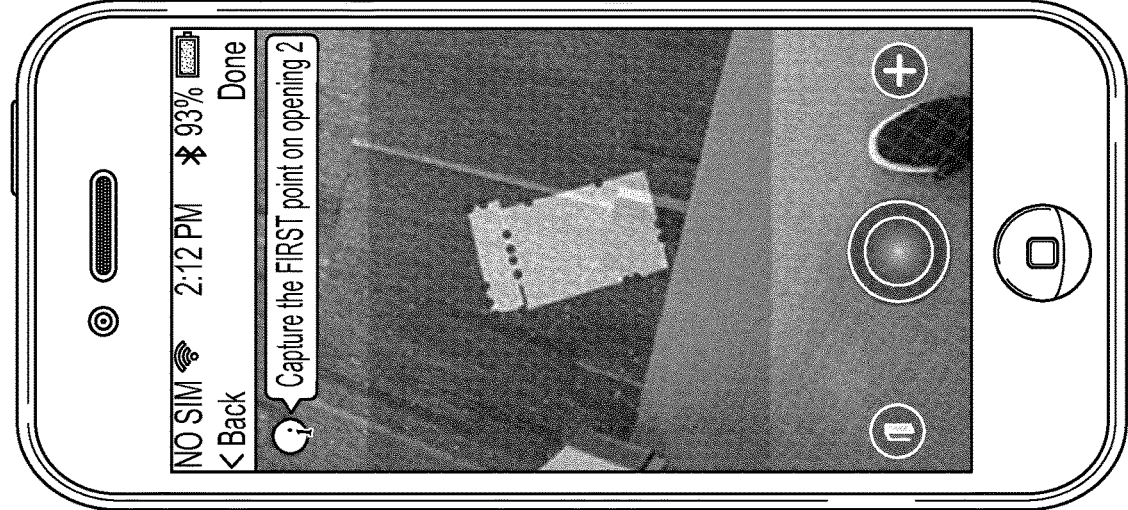
Figure 10:
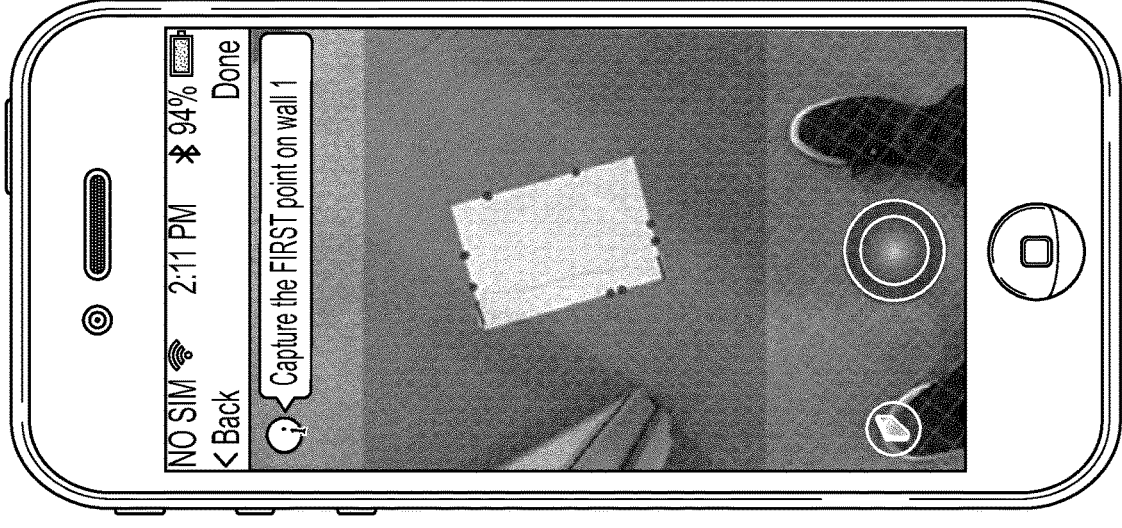

Returning to FIG. 2, in step 36, the system determines whether there are more rooms that need to be capture. Specifically, the system gives the user an option to add more rooms. When the user elects to add more rooms, the system will proceed to step 38, where the system will reenter the wall capture mode for a further room. It should be understood that the system will track the motion of the device as it is moved to the next room. This allows the system to maintain relative placement of the walls from one room to the next. In the further room, the user can again go through the process of capturing walls and room openings. This allows the user to add as many rooms as necessary to generate a complete floor plan. FIG. 10 is an illustration showing the user capturing the walls and openings for a first room and a second room, and the generated floor plan of the first room and the second room.

Figure 11:
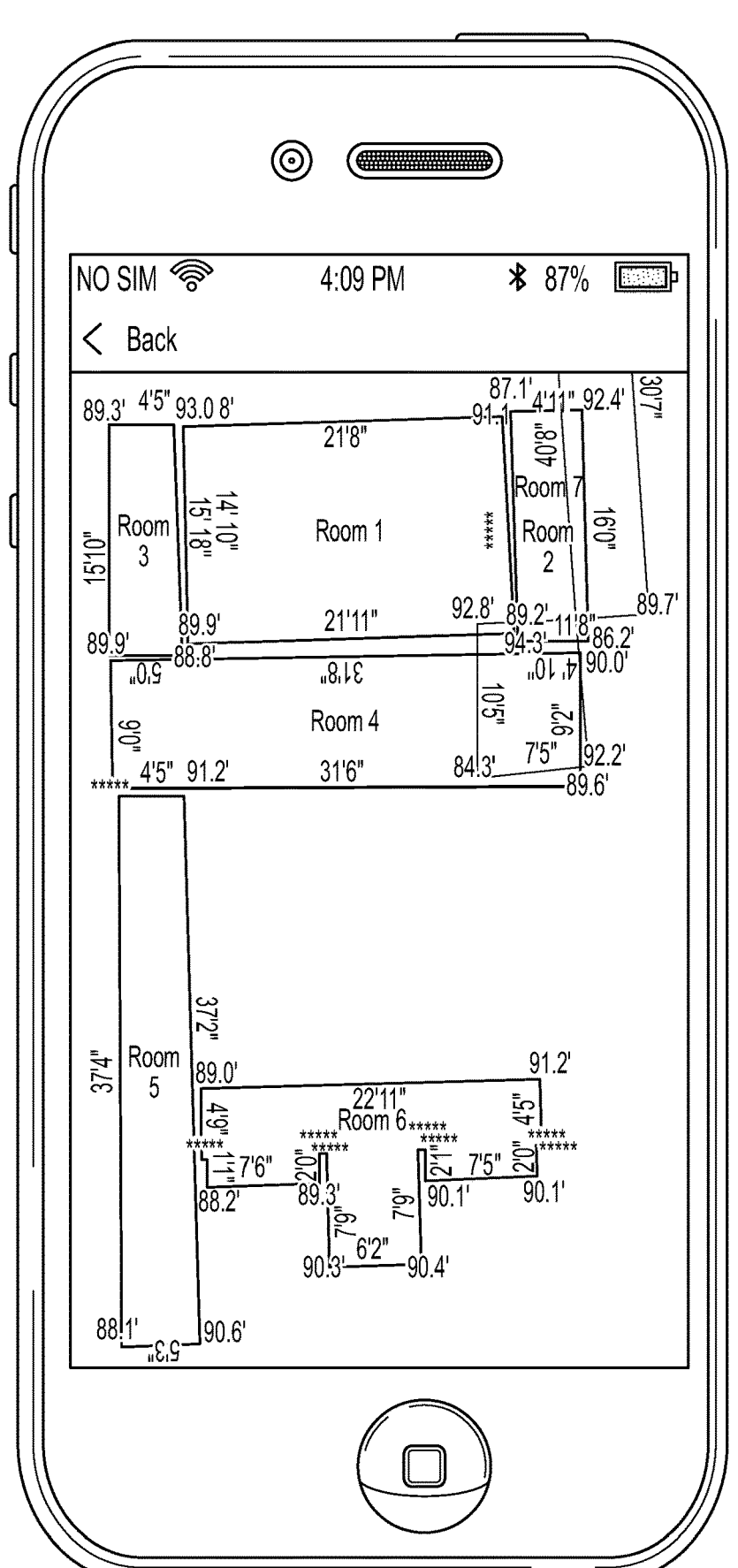
FIGS. 11 and 12 are diagrams illustrating the dimensioned floor plan generated by the system.
Figure 12:
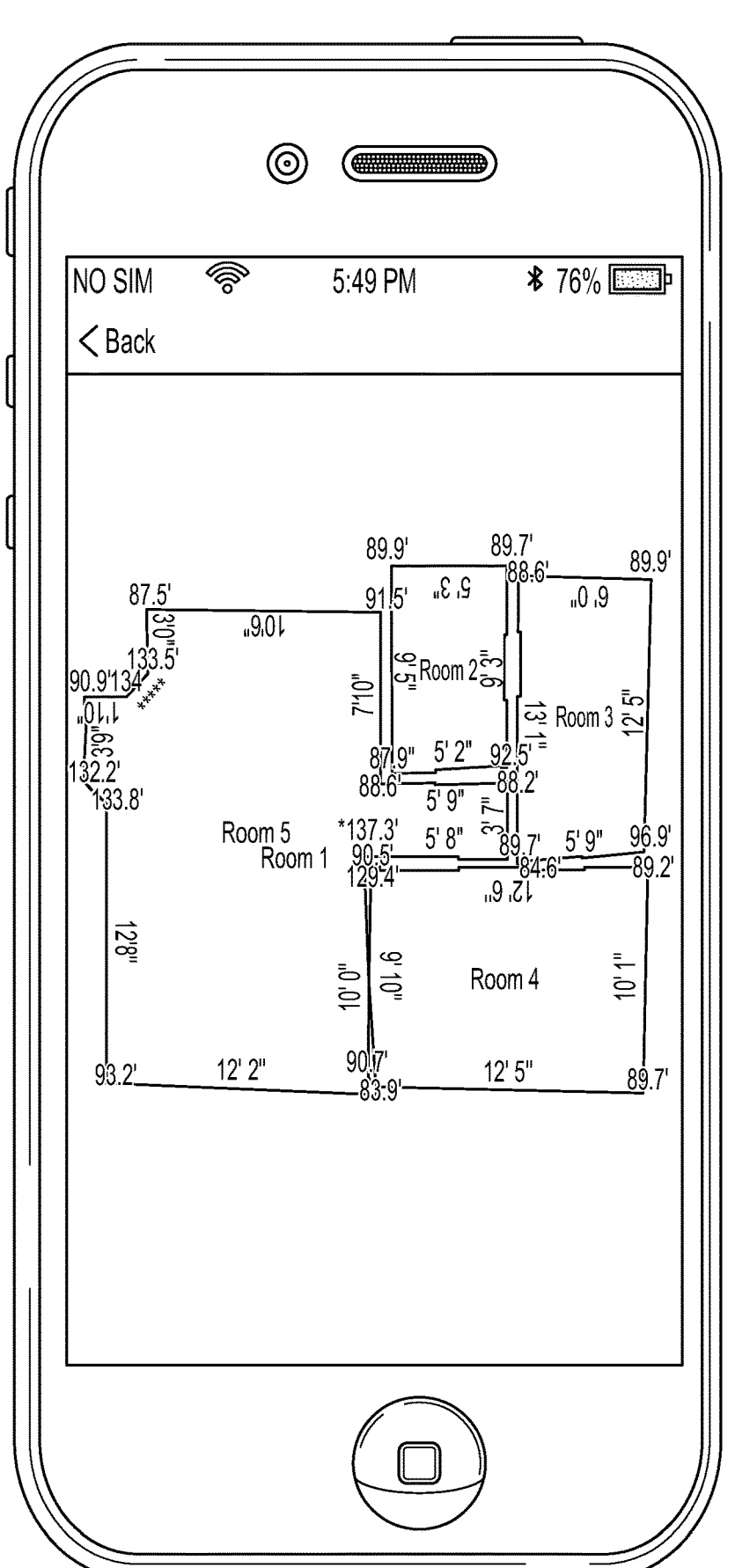

In step 40, the system will generate a dimensioned floor plan. FIGS. 11 and 12 are illustrations of the dimensioned floor plan. It should be understood that the user can select units (e.g., meters, feet. etc.) representing the dimensions of the walls and openings, as well as toggle between which dimensions are shown. The floor plan can be exported to other applications via, for example, the network 16.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A system for generating a floor plan using a mobile device, comprising:
   a memory; and
   a processor in communication with the memory, the processor:
   capturing a plurality of walls in a room using one or more sensors of the mobile device, wherein, for each wall of the plurality of walls in the room, a surface of the mobile device is positioned against the wall and at least one point is captured for the wall when the mobile device is positioned against the wall;
   capturing one or more openings in the room using the one or more sensors of the mobile device by capturing at least two points corresponding to the one or more openings when the mobile device is positioned on or next to ends of the opening;
   causing the mobile device to display an overhead view of the plurality of walls, the overhead view updated to show user movement and wall points when the mobile device is moved from one location in space to another location in space to allow a user to monitor positional tracking; and
   generating a floor plan based on the plurality of walls and the one or more openings.

2. The system of claim 1, wherein the processor captures a wall by capturing a first point on the wall and a second point on the wall, and defines a first line between the first point and the second point.

3. The system of claim 2, wherein the first point and the second point are at least six inches apart from one another.

4. The system of claim 2, wherein the processor tracks a movement of a user to determine a location of the second point relative to the first point.

5. The system of claim 2, wherein the processor determines a corner by calculating intersecting points of the first line and a second line.

6. The system of claim 1, wherein the one or more openings comprises at least one of a doorway, a window, or a closet.

7. The system of claim 1, wherein the processor generates a prompt that is displayed on the mobile device to inquire whether further rooms need to be captured.

8. The system of claim 1, wherein the processor displays the overhead view on the mobile device while capturing the plurality of walls in the room and the one or more openings in the room.

9. The system of claim 1, wherein the processor determines whether more walls need to be captured by comparing an amount of walls captured to a predetermined threshold.

10. The system of claim 1, wherein the processor determines whether more openings need to be captured by comparing an amount of openings captured to a predetermined threshold.

11. A method for generating floor plans using a mobile device, comprising:
   capturing a plurality of walls in a room using one or more sensors of the mobile device, wherein, for each wall of the plurality of walls in the room, a surface of the mobile device is positioned against the wall and at least one point is captured for the wall when the mobile device is positioned against the wall;
   capturing one or more openings in the room using the one or more sensors of the mobile device by capturing at least two points corresponding to the one or more openings when the mobile device is positioned on or next to ends of the opening;

causing the mobile device to display an overhead view of the plurality of walls, the overhead view updated to show user movement and wall points when the mobile device is moved from one location in space to another location in space to allow a user to monitor positional tracking; and generating a floor plan based on the plurality of walls and the one or more openings.

12. The method of claim 11, further comprising capturing a wall by capturing a first point on the wall and a second point on the wall, and defining a first line between the first point and the second point.

13. The method of claim 12, wherein the first point and the second point are at least six inches apart from one another.

14. The method of claim 12, further comprising tracking a movement of a user to determine a location of the second point relative to the first point.

15. The method of claim 12, further comprising determining a corner by calculating intersecting points of the first line and a second line.

16. The method of claim 11, wherein the one or more openings comprises at least one of a doorway, a window, or a closet.

17. The method of claim 11, further comprising generating a prompt that is displayed on the mobile device to inquire whether further rooms need to be captured.

18. The method of claim 11, further comprising displaying the overhead view on the mobile device while performing steps of capturing the plurality of walls in the room and capturing the one or more openings in the room.

19. The method of claim 11, further comprising determining whether more walls need to be captured by comparing an amount of walls captured to a predetermined threshold.

20. The method of claim 11, further comprising determining whether more openings need to be captured by comparing an amount of openings captured to a predetermined threshold.

\* \* \* \* \*